UNITED STATES PATENT OFFICE.

CHARLES V. STEHLIN AND JOSEPH STEHLIN, OF NEW YORK, AND HEINRICH A. HAAN, OF BROOKLYN, N. Y.

IMPROVEMENT IN THE PROCESSES OF MANUFACTURING PAPER FROM GRAINS.

Specification forming part of Letters Patent No. 144,294, dated November 4, 1873; application filed February 15, 1873.

*To all whom it may concern:*

Be it known that we, CHARLES V. STEHLIN and JOSEPH STEHLIN, of the city, county, and State of New York, and HEINRICH A. HAAN, of Brooklyn, in the county of Kings and State of New York, have invented a new and Improved Process of Manufacturing Paper from Grains and Hops, of which the following is a specification:

The object of my invention is to utilize the residue of the malt, after the process of brewing, for the purpose of producing the short fibers of the same and applying them to the manufacture of paper. By the brewing process the saccharine parts of the malt are extracted and the residue thereof, known by the name of "brewers' grains," or grains and hops of the mash-tub, sold as feed, on account of the starchy substances still contained therein. The value of these grains and hops is not great, as they may be obtained in almost unlimited quantities in the market. By using these grains and hops for the purpose of preparing the woody fiber therefrom, the starchy nutritious substances may also be gained and sold as feed. The residue of the hops, after the extraction of the *lupulin* of the same, is worthless and is thrown away.

The grains and hops are submitted to a continued rolling and mashing process, to separate the fibers and the starchy substances, by the mechanical action of the water and the pressure of the rollers, then treated with caustic lyes, bleached by chlorine, and manufactured into paper. The barley-grains and hops, as received from the breweries, are thoroughly soaked in water to a mashy consistency and carried over a guide-frame of wire-gauze through rollers, which press and bruise them, and partly separate the starchy substances from the fibers. The fibrous parts are carried on over the guide-frame. The starch dissolved in water passes through the wire-gauze into suitable receptacles, and is carried off for condensation and extraction. The fibrous parts are submitted to a thorough mashing process, and then carried over a wire-sieve, so that the watery solution of the starch may flow off. The hops are treated in a similar manner, with the exception of the rolling process, as the fibers of the hops are of such thin structure that the pressure of the rollers would injure them. The fibers thus obtained are macerated in a solution of caustic lyes, which dissolve the glutinous and other substances, and produce the short woody fibers of the grains and hops. A pulpy mass is gradually obtained, which, after being bleached by chlorine, may be manufactured directly, or by mixture with other fibers, into the different sorts of paper as desired.

Having thus described our invention, we claim as new and desire to secure by Letters Patent—

The process of preparing grain-fiber for bleaching and for being subsequently manufactured into paper by passing the moistened fiber on wire-gauze sheets between compressing-rolls; secondly, water-washing it on sieves; and thirdly, macerating it in caustic alkali, as set forth.

CHARLES V. STEHLIN.
JOSEPH STEHLIN.
HEINRICH A. HAAN.

Witnesses:
 PAUL GOEPEL,
 T. B. MOSHER.